United States Patent [19]

Furutoh

[11] Patent Number: 5,736,746
[45] Date of Patent: Apr. 7, 1998

[54] RADIATION IMAGE READ-OUT APPARATUS

[75] Inventor: Takashi Furutoh, Kanagawa-ken, Japan

[73] Assignee: Fuji Photo Film Co., Ltd., Kanagwa, Japan

[21] Appl. No.: 711,324

[22] Filed: Sep. 3, 1996

[30] Foreign Application Priority Data

Aug. 31, 1995 [JP] Japan ............................ 7-223329
Aug. 31, 1995 [JP] Japan ............................ 7-223330
Sep. 13, 1995 [JP] Japan ............................ 7-235137

[51] Int. Cl.$^6$ ............................ G03B 42/02
[52] U.S. Cl. ............................ 250/589; 250/584
[58] Field of Search ............................ 250/588, 589, 250/584

[56] References Cited

U.S. PATENT DOCUMENTS 4,975,580 12/1990 Ohgoda et al. ............................ 250/589
5,530,259 6/1996 Arakawa ............................ 250/589 X

FOREIGN PATENT DOCUMENTS 62-246044 10/1987 Japan ............................ 250/589
64-55547 3/1989 Japan ............................ 250/589
4-55850 2/1992 Japan ............................ 250/589

*Primary Examiner*—Edward J. Glick
*Attorney, Agent, or Firm*—Sughrue, Mion, Zinn, Macpeak & Seas, PLLC

[57] ABSTRACT

In a radiation image read-out apparatus, a radiation image read-out section reads out a radiation image stored on a stimulable phosphor sheet, and an erasing section erases residual image information remaining on the stimulable phosphor sheet after read-out. A plurality of cassettes each containing therein a stimulable phosphor sheet are loaded in a cassette holding section. The stimulable phosphor sheet is taken out from arbitrary one of the cassettes, transferred to the radiation image read-out section and the erasing section and returned to the same cassette from that the stimulable phosphor sheet is taken out.

3 Claims, 8 Drawing Sheets

RADIATION IMAGE READ-OUT APPARATUS

BACKGROUND OF THE INVENTION

1. Field of the Invention

This invention relates to a radiation image read-out apparatus for use in a radiation recording and reproducing system, and more particularly to a radiation image read-out apparatus having a read-out section and an erasing section integrally combined with each other.

2. Description of the Related Art

When certain kinds of phosphors are exposed to radiation such as X-rays, α-rays, β-rays, γ-rays, cathode rays or ultraviolet rays, they store a part of the energy of the radiation. Then, when the phosphor which has been exposed to the radiation is exposed to stimulating rays such as visible light, light is emitted from the phosphor in proportion to the stored energy of the radiation. A phosphor exhibiting such properties is referred to as "a stimulable phosphor". It has been proposed to use stimulable phosphors in radiation image recording and reproducing systems. Specifically, a radiation image of an object, such as a human body, is recorded on a sheet provided with a layer of the stimulable phosphor (hereinafter referred to as a stimulable phosphor sheet). The stimulable phosphor sheet, on which the radiation image has been stored, is then exposed to stimulating rays, such as a laser beam, which cause it to emit light in proportion to the amount of energy stored thereon during its exposure to the radiation. The light emitted by the stimulable phosphor sheet, upon stimulation thereof, is photoelectrically detected and converted into an electric image signal. The image signal is then processed and used for the reproduction of the radiation image of the object as a visible image on a recording material, such as photographic material, or on a display device, such as a cathode ray tube (CRT) display device. See Japanese Unexamined Patent Publication No. 56(1981)-11395, and U.S. Pat. No. 4,258, 264, 4,315,318, 4,387,428, 4,276,473 and the like.

The stimulable phosphor sheet is for recording and temporarily storing the radiation image until the radiation image is read out by scanning with the stimulating rays. Accordingly it is preferred that the residual image information on the stimulable phosphor sheet be erased and the stimulable phosphor sheet be reused.

In order to meet such a requirement, there has been proposed a radiation image read-out apparatus provided with an erasing section for erasing the residual image information as well as a read-out section. (See, for instance, Japanese Unexamined Patent Publication No. 6(1994)-258737 and U.S. Pat. No. 5,379,997.)

In the radiation image read-out apparatus, a cassette containing therein a stimulable phosphor sheet, on which a radiation image has been stored, is mounted on a cassette holding section and the stimulable phosphor sheet is taken out from the cassette and transferred to the read-out section, where the radiation image is read out from the stimulable phosphor sheet. After the radiation image is read out, the stimulable phosphor sheet is transferred to the erasing section and the residual image information is erased. After erasure, the stimulable phosphor sheet may be reused, and generally it is returned to the cassette.

In conventional apparatuses, cassettes are loaded in the cassette holding section one by one and accordingly, when a first cassette is loaded, a second cassette cannot be loaded until the stimulable phosphor sheet in the first cassette is taken out, the radiation image thereon is read out, the residual image is erased and the stimulable phosphor sheet is returned to the cassette. Thus there is a problem that the operation of loading and unloading the cassettes is troublesome. That is, when a plurality of radiation images are continuously recorded on stimulable phosphor sheets and the exposed stimulable phosphor sheets are sent to the read-out apparatus in sequence, it is necessary to change cassettes every time the processing for each stimulable phosphor sheet is ended in view of the operating efficiency of the read-out apparatus. Accordingly the operator must wait carrying a change of cassette and the time for which the operator is engaged becomes long. Thus changing cassettes is a troublesome and inefficient operation.

In order to overcome such a problem, there has been proposed a radiation image read-out apparatus in which a plurality of cassettes can be loaded in the cassette holding section, and a stimulable phosphor sheet is taken out from arbitrary one of the cassettes and then put in arbitrary one of the cassettes after the image stored thereon is read out and the residual image information is erased. In this apparatus, a plurality of cassettes are loaded and unloaded at one time and accordingly change of cassettes may be made less frequently and the stimulable phosphor sheets can be processed continuously.

However the apparatus where a stimulable phosphor sheet is returned to arbitrary one of the cassettes is disadvantageous in that it can be applied to a plurality of cassettes of the same size containing therein stimulable phosphor sheets of the same size but cannot be applied to a plurality of cassettes of different sizes containing therein stimulable phosphor sheets of different sizes since a stimulable phosphor sheet of a size can be accommodated only in a cassette of a corresponding size.

In an apparatus disclosed in Japanese Unexamined Patent Publication No. 5(1993)-254618, a plurality of cassettes are supported by a pair of opposed conveyors and arbitrary one of the cassettes is taken out by moving up and down the conveyors, and the stimulable phosphor sheet therein is subjected to read-out and erasure. The apparatus can handle cassettes of different sizes by mounting an adapter on a cassette smaller than the space between the conveyors.

However mounting of the adapters adds to work of the operators.

Further there has been known an apparatus in which stimulable phosphor sheets are taken out from a plurality of cassettes and the cassette from which the stimulable phosphor sheet has been taken out is moved horizontally to a sheet receiving station while kept flat, where the sheet is put in the cassette. (Japanese Unexamined Patent Publication No. 6(1994)-43565)

However this apparatus is disadvantageous in that since the cassette and the stimulable phosphor sheet are moved horizontally relative to the apparatus, the size of the apparatus is increased in the horizontal direction and the apparatus requires a large space to install.

SUMMARY OF THE INVENTION

In view of the foregoing observations and description, the primary object of the present invention is to provide a radiation image read-out apparatus in which a plurality of stimulable phosphor sheets including those of different sizes can be continuously processed without frequently changing the cassettes.

Another object of the present invention is to provide a radiation image read-out apparatus in which a plurality of stimulable phosphor sheets can be continuously processed without frequently changing the cassettes and which is small in size in horizontal directions.

In accordance with one aspect of the present invention, there is provided a radiation image read-out apparatus comprising a radiation image read-out section which reads out a radiation image stored on a stimulable phosphor sheet, an erasing section which erases residual image information remaining on the stimulable phosphor sheet after read-out, a cassette holding section in which a plurality of cassettes each containing therein a stimulable phosphor sheet are loaded, and a sheet transfer means which takes out the stimulable phosphor sheet from arbitrary one of the cassettes, transfers the stimulable phosphor sheet to the radiation image read-out section and the erasing section and returns the stimulable phosphor sheet to the same cassette from that the stimulable phosphor sheet is taken out.

In the radiation image read-out apparatus, a plurality of cassettes are loaded in the cassette holding section, and the stimulable phosphor sheets in the cassettes are processed one by one and returned to the same cassettes. Then the cassettes are unloaded at one time and accordingly change of cassettes may be made less frequently and the stimulable phosphor sheets can be processed continuously. Further since the stimulable phosphor sheet taken out from each cassette is returned to the same cassette, the stimulable phosphor sheet cannot be inserted into a cassette of wrong size.

In accordance with another aspect of the present invention, there is provided a radiation image read-out apparatus comprising a radiation image read-out section which reads out a radiation image stored on a stimulable phosphor sheet, an erasing section which erases residual image information remaining on the stimulable phosphor sheet after read-out, a cassette holding section in which a plurality of cassettes each containing therein a stimulable phosphor sheet are loaded in a plurality of stacks of the cassettes of different sizes, each stack formed of a group of cassettes of a size, a cassette delivery means which takes out arbitrary one of the cassettes from the cassette holding section and holds it, a sheet transfer means which takes out the stimulable phosphor sheet from the cassette held by the cassette delivery means, transfers the stimulable phosphor sheet to the radiation image read-out section and the erasing section and returns the stimulable phosphor sheet to the cassette held by the cassette delivery means, and a cassette receiving section which receives the cassettes in sequence from the cassette delivery means after read-out and erasure and stores them in a stack.

In the radiation image read-out apparatus, a plurality of stimulable phosphor sheets of different sizes are loaded in the cassette holding section in a stack with the stimulable phosphor sheets of each size being grouped and arbitrary one of the cassettes is taken out from the cassette holding section and held by the cassette delivery means. With the cassette held by the cassette delivery means, the stimulable phosphor sheet in the cassette is taken out and transferred to the read-out section and the erasing section, and thereafter is returned to the cassette held by the cassette delivery means. Then the cassette is transferred to the cassette receiving section. A plurality of cassettes thus transferred to the cassette receiving section are stored in a stack in the cassette receiving section.

Accordingly in the radiation image read-out apparatus, by simply loading a plurality of cassettes of different sizes in a stack in the cassette holding section, the stimulable phosphor sheets in the cassettes are processed one by one and stacked in the cassette receiving section. Thus a plurality cassettes of different sizes can be continuously processed without a troublesome operation.

In accordance with still another aspect of the present invention, there is provided a radiation image read-out apparatus comprising a radiation image read-out section which reads out a radiation image stored on a stimulable phosphor sheet, an erasing section which erases residual image information remaining on the stimulable phosphor sheet after read-out, a cassette holding section which holds a plurality of cassettes, a cassette delivery means which takes out one of the cassettes from the cassette holding section and holds it, a sheet transfer means which takes out the stimulable phosphor sheet from the cassette held by the cassette delivery means, transfers the stimulable phosphor sheet to the radiation image read-out section and the erasing section and returns the stimulable phosphor sheet to the cassette held by the cassette delivery means, a cassette receiving section which receives the cassettes in sequence after read-out and erasure, the cassette holding section and the cassette receiving section being disposed above the radiation image read-out section and the erasing section one behind the other, and a cassette transfer means which transfers the cassette, in which the stimulable phosphor sheet after read-out and erasure has been returned, above the cassette holding section and to the cassette receiving section.

In the radiation image read-out apparatus, since the cassette holding section and the cassette receiving section are disposed above the read-out section and the erasing section and the cassette is vertically transferred to the read-out section and the erasing section from the cassette holding section and to the cassette receiving section from the read-out section and the erasing section, the size of the apparatus in the horizontal direction can be small and the apparatus requires a relatively small space to install. Further since a plurality of cassettes can be loaded and unloaded at one time, change of cassettes may be made less frequently and the stimulable phosphor sheets can be processed continuously. Further since the cassette holding section and the cassette receiving section are disposed above the read-out section and the erasing section, the operator can change cassettes in a standing position, thereby facilitating change of cassettes and improving working efficiency.

DESCRIPTION OF THE PREFERRED EMBODIMENTS

Figure 1:
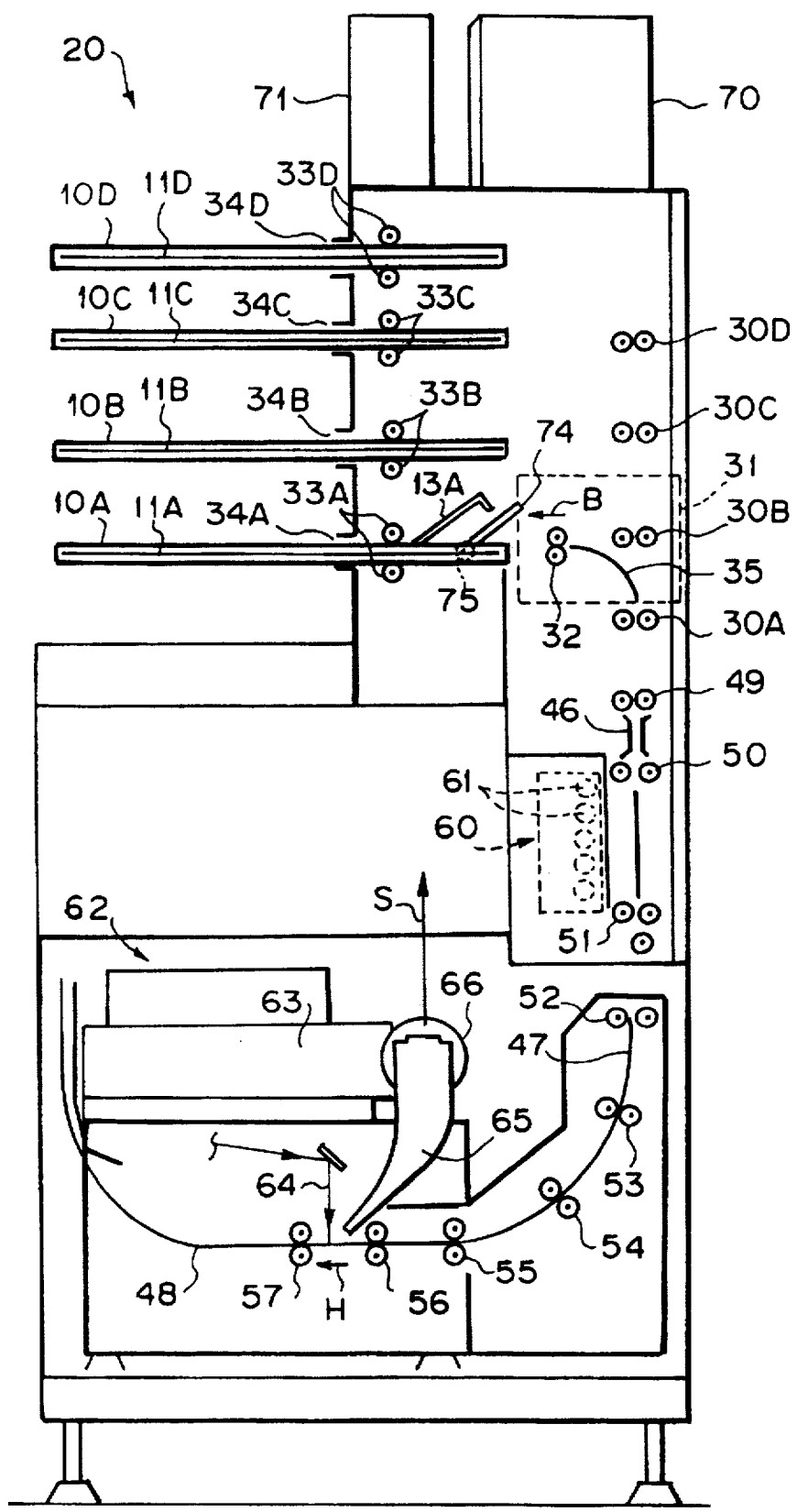
FIG. 1 is a schematic view of a radiation image read-out apparatus in accordance with a first embodiment of the present invention.

As shown in FIG. 1, four cassettes 10A to 10D respectively containing therein four stimulable phosphor sheets 11A to 11D, on which radiation images have been stored, are loaded in a radiation image read-out apparatus 20 in accordance with one embodiment of the present invention. The radiation image read-out apparatus 20 has a cassette holding section having four openings 34A to 34D and the cassettes 10A to 10D are inserted into the openings 34A to 34D and held there by four pairs of light-shielding rollers 33A to 33D. The light-shielding rollers 33A to 33D are somewhat larger in length than the width of the cassettes 10A to 10D. Each pair of rollers are urged toward each other by a means not shown and held at a predetermined distance from each other by stoppers not shown.

Each of the cassettes 10A to 10D has a lid 13A, and each of the cassettes 10A to 10D is inserted from the end having the lid 13A between the corresponding pair of light-shielding rollers through the opening pushing apart the rollers to a predetermined position, where the cassette abuts against a stopper (not shown). Four pairs of nip rollers 30A to 30D are provided for the respective cassettes 10A to 10D.

When an instruction to read out the radiation image from the stimulable phosphor sheet is output from a console 71, the lid 13A of the cassette 10A is opened by a suitable means and a roller arm 74 carrying thereon a roller 75 is moved toward the cassette 10A in the direction of arrow B. The roller arm 74 is stopped when the roller 75 thereon is brought into contact with the stimulable phosphor sheet 11A in the cassette 10A. The roller arm 74, a pair of nip rollers 32 (to be described later) and a guide plate 35 (to be described later) are supported on a lift means 31 movable up and down in the radiation image read-out apparatus 20. The lift means 31 is moved up and down according to the cassette from which the stimulable phosphor sheet is to be taken out.

As will be described later, the stimulable phosphor sheet is returned to the cassette from which the stimulable phosphor sheet is taken out after read-out and erasure. Accordingly premature withdrawal of the cassettes 10A to 10D is prevented by a suitable means, for instance, by a pin inserted into an engagement hole formed in each cassette.

Then the roller 75 is rotated in the counterclockwise direction by a drive means not shown to feed out the stimulable phosphor sheet 11A from the cassette 10A. The stimulable phosphor sheet 11A is transferred to a read-out section 62 through an erasing section 60 by a sheet transfer system comprising the nip rollers 32, the guide plate 35, the nip rollers 30A, guide plates 46, 47 and 48, nip rollers 49 to 57 and the like. Though being well known as disclosed, for instance, in U.S. Pat. No. 4,258,264, the image read-out processing in the read-out section 62 will be briefly described hereinbelow. While conveying the stimulable phosphor sheet 11A at a constant speed in the direction of arrow H for sub-scanning by nip rollers 55, 56 and 57, a stimulating laser beam 64 emitted from a main scanning optical system 63 is caused to scan the stimulable phosphor sheet 11A in a direction substantially perpendicular to the direction of arrow H for main scanning with the output of the laser beam 64 controlled according to read-out conditions.

When the stimulable phosphor sheet 11A is exposed to the laser beam 64, the exposed portion of the stimulable phosphor sheet 11A emits light in an amount proportional to the amount of radiation energy stored thereon and the emitted light is guided by a light guide member 65 and photoelectrically detected by a photomultiplier 66. Thus the photomultiplier 66 outputs an image signal S representing the radiation image stored on the stimulable phosphor sheet 11A. The image signal S is processed and used for the reproduction of the radiation image of the object as a visible image on a cathode ray tube (CRT) display device 70, which is directed leftward in FIG. 1 in view of easiness in observation. Otherwise the processed image signal S may be sent to an image reproducing system such as a light beam scanning recording system.

After read-out of the radiation image, the nip rollers 49 to 57 are reversed to convey the stimulable phosphor sheet 11A from the read-out section 62 to the cassette holding section via the erasing section 60. When the stimulable phosphor sheet 11A is passed through the erasing section 60, a plurality of erasing light sources 61 are put on and the stimulable phosphor sheet 11A is exposed to erasing light from the sources 61, whereby residual radiation energy on the stimulable phosphor sheet 11A is released and the stimulable phosphor sheet 11A is recovered.

Thereafter the recovered stimulable phosphor sheet 11A is returned to the cassette 10A by the roller 75 which is now rotated in the clockwise direction. Then the roller arm 74 is retracted away from the cassette 10A to return the roller 75 to a waiting position and the lid 13A is closed by said means for opening the lid 13A. When a detecting means detects that the roller 75 has been returned to the waiting position, the lift means 31 moves upward to bring the roller arm 74, the roller 75 and the nip rollers 32 to a position where they take out the stimulable phosphor sheet 11B in the cassette 10B.

The stimulable phosphor sheet 11B in the cassette 10B is then taken out, the radiation image on the stimulable phosphor sheet lib is read out, the residual radiation energy is released and the stimulable phosphor sheet 11B is returned to the cassette 10B in the manner described above. The same procedures are repeated on the other cassettes 11C and 11D in sequence.

Thus in this embodiment, four cassettes 10A to 10D are loaded at one time and the four cassettes 10A to 10D are unloaded at one time after processed. Accordingly, change of cassettes may be made less frequently and the stimulable phosphor sheets can be processed continuously. Further since the stimulable phosphor sheet taken out from each cassette is returned to the same cassette, the stimulable phosphor sheet cannot be inserted into a cassette of a wrong size.

A radiation image read-out apparatus 120 in accordance with a second embodiment of the present invention will be described with reference to FIGS. 2 to 5, hereinbelow.

Figure 2:
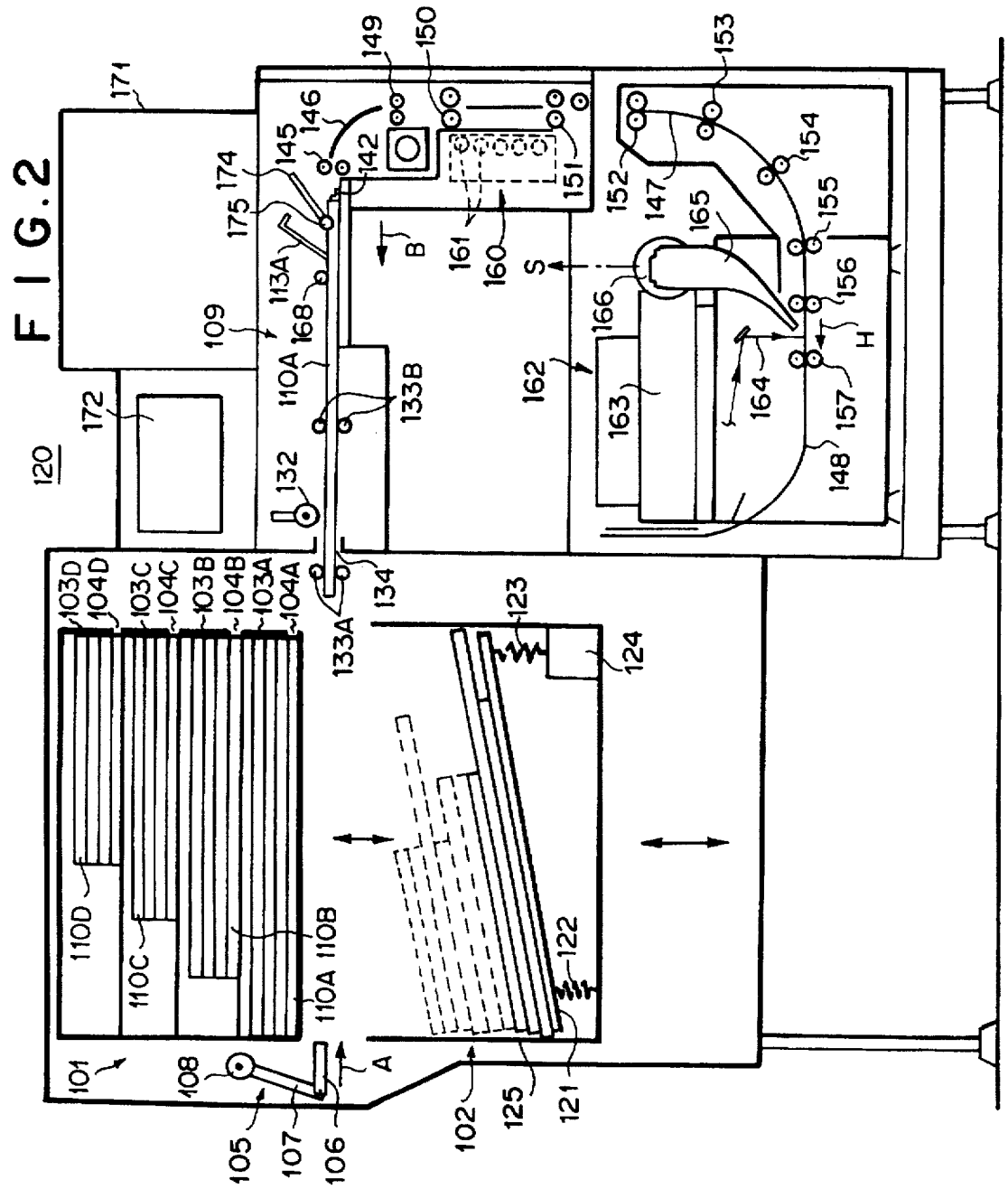
FIG. 2 is a schematic view of a radiation image read-out apparatus in accordance with a second embodiment of the present invention.
Figure 3:
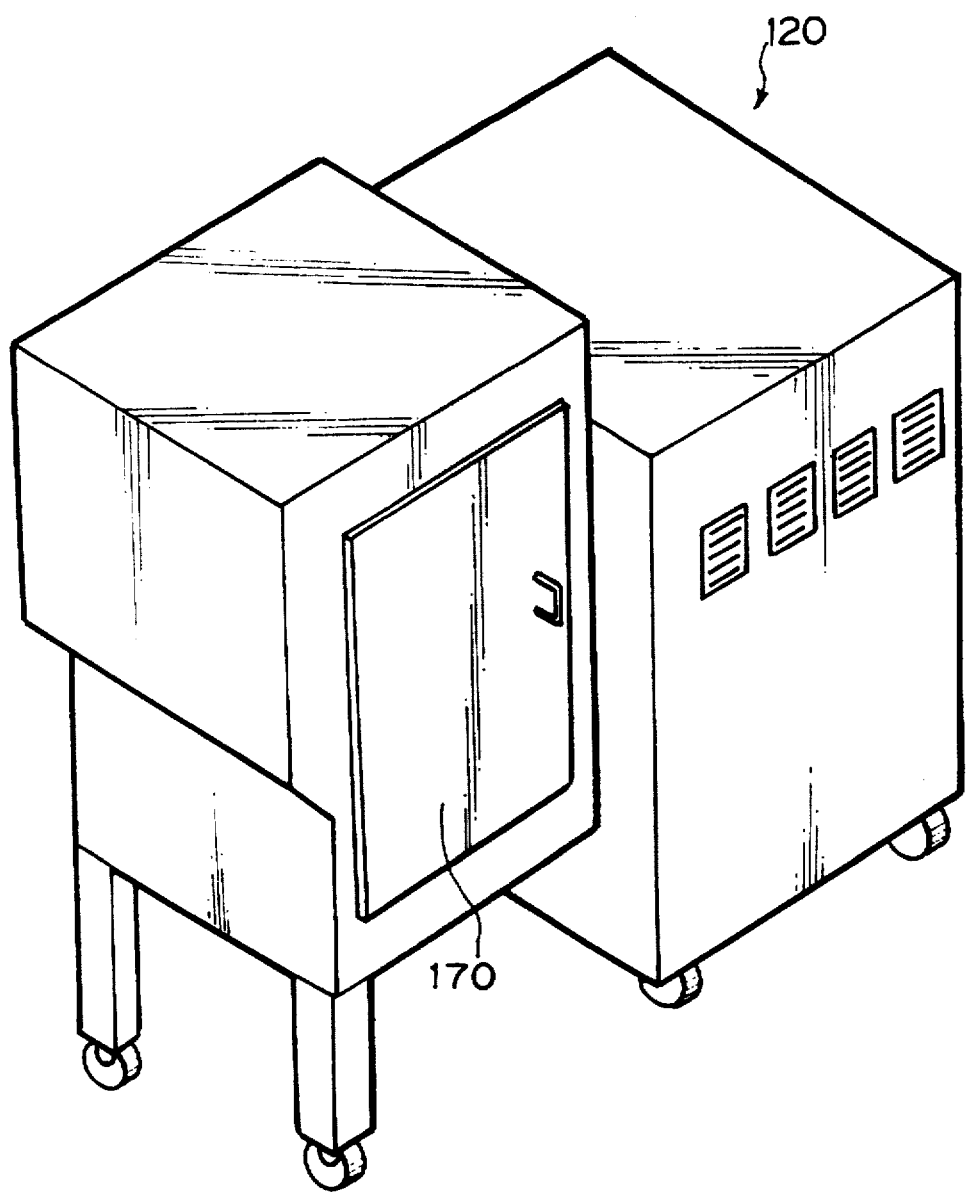
FIG. 3 is a perspective view showing an appearance of the radiation image read-out apparatus of the second embodiment.

As shown in FIG. 2, four groups of cassettes 110A to 110D of different sizes each group including five cassettes are loaded in a cassette holding section 101 of the radiation image read-out apparatus 120. As shown in FIG. 3, the cassette holding section 101 is provided with a door 170 and the cassettes 110A to 110B are loaded in the cassette holding section 101 with the door 170 open.

The cassette holding section 101 has four compartments 103A to 103D arranged in a vertical direction and is movable up and down. A stack of five cassettes can be held in each of the compartments 103A to 103D. Slits 104A to 104D are formed opposed to lowermost cassettes in the respective compartments. Each slit permits only one cassette to pass therethrough. An inserting means 105 for inserting the lowermost cassette in each compartment into a cassette delivery means 109 (to be described later) comprises an abutment portion 106 which is adapted to abut against the left side end face of the cassette and is mounted for rotation on an arm 107 which is driven by a driver 108. The abutment portion 106 is moved in the direction of arrow A in FIG. 2 to push rightward the lowermost cassette into the cassette delivery means 109.

The cassette is inserted into the cassette delivery means 109 through an opening 134 and held by two pairs of light-shielding rollers 133A and 133B. Each pair of rollers are urged toward each other by a means not shown and held at a predetermined distance from each other by stoppers not shown. Each roller is somewhat larger in length than the width of the cassettes.

Each of the cassettes 110A to 110D is moved in the following manner and the radiation image stored on the stimulable phosphor sheet in the cassette is read out and the residual radiation energy remaining on the stimulable phosphor sheet after read-out is erased.

The cassette holding section 101 is moved up or down so that the lowermost cassette in a desired one of the compartments 103A to 103D or in the group of a desired size is opposed to the cassette inserting means 105. Then the cassette inserting means 105 pushes the lowermost cassette (indicated at 110A in FIG. 2 by way of example) toward the cassette holding section 109. The cassette 110A is inserted between the light-shielding rollers 133A, into the opening 134 and between the light-shielding rollers 133B pushing apart each pair of light-shielding rollers from each other. The cassette 110A is stopped at a predetermined position where the leading end face of the cassette 110A abuts against a stopper 142.

When an instruction to read out the radiation image from the stimulable phosphor sheet is output from a console 171, the lid 113A of the cassette 110A is opened by a suitable means and a roller arm 174 carrying thereon a roller 175 is moved toward the cassette 110A in the direction of arrow B. The roller arm 174 is stopped when the roller 175 thereon is brought into contact with the stimulable phosphor sheet in the cassette 110A.

Then the roller 175 is rotated in the counterclockwise direction by a drive means not shown to feed out the stimulable phosphor sheet from the cassette 110A. The stimulable phosphor sheet is transferred to a read-out section 162 through an erasing section 160 by a sheet transfer system comprising guide plates 146, 147 and 148, nip rollers 145 and 149 to 157 and the like. Though being well known as disclosed, for instance, in U.S. Pat. No. 4,258,264, the image read-out processing in the read-out section 162 will be briefly described hereinbelow. While conveying the stimulable phosphor sheet at a constant speed in the direction of arrow H for sub-scanning by nip rollers 155, 156 and 157, a stimulating laser beam 164 emitted from a main scanning optical system 163 is caused to scan the stimulable phosphor sheet in a direction substantially perpendicular to the direction of arrow H for main scanning with the output of the laser beam 164 controlled according to read-out conditions.

When the stimulable phosphor sheet is exposed to the laser beam 164, the exposed portion of the stimulable phosphor sheet emits light in an amount proportional to the amount of radiation energy stored thereon and the emitted light is guided by a light guide member 165 and photoelectrically detected by a photomultiplier 166. Thus the photomultiplier 166 outputs an image signal S representing the radiation image stored on the stimulable phosphor sheet. The image signal S is processed and used for the reproduction of the radiation image of the object as a visible image on a Cathode ray tube (CRT) display device 172. Otherwise the processed image signal S may be sent to an image reproducing system such as a light beam scanning recording system.

After read-out of the radiation image, the nip rollers 149 to 157 are reversed to convey the stimulable phosphor sheet from the read-out section 162 to the cassette delivery means 109 via the erasing section 160. When the stimulable phosphor sheet is passed through the erasing section 160, a plurality of erasing light sources 161 are put on and the stimulable phosphor sheet is exposed to erasing light from the sources 161, whereby residual radiation energy on the stimulable phosphor sheet is released and the stimulable phosphor sheet is recovered.

Thereafter the recovered stimulable phosphor sheet is returned to the cassette 110A by the roller 175 which is now rotated in the clockwise direction. Then the roller arm 174 is retracted away from the cassette 110A to return the roller 175 to a waiting position and the lid 113A is closed by said means for opening the lid 113A. When a detecting means detects that the roller 175 has been returned to the waiting position, a conveyor roller 132 is brought into contact with the cassette 110A and is rotated in the clockwise direction to remove the cassette 110A from the cassette delivery means 109. The cassette 110A then falls into a cassette receiving section 102 under gravity.

The cassette receiving section 102 comprises a cassette receiving box 125 open upward. A support plate 121 is supported on the bottom of the cassette receiving box 125 byway of a pair of springs 122 and 123. The spring 122 is directly mounted on the bottom of the cassette receiving box 125 and the spring 123 is mounted on a base 124 which is fixed to the bottom of the cassette receiving box 125 so that the support plate 125 is inclined with its left edge held lower than its right edge. The cassettes falling into the cassette receiving box 125 are supported on the support plate 121 with their left edges aligned with each other by virtue of the inclination of the support plate 121. As the number of the cassettes on the support plate 121 increases, the springs 122 and 123 are compressed and the support plate 121 is lowered, thereby providing a space for accommodating all the cassettes 110A to 110D. The cassette receiving box 125 is movable up and down and is moved downward as the number of the cassettes on the support plate 121 increases, thereby facilitating reception of the cassettes.

Then the cassette holding section 101 is moved up or down so that the lowermost cassette in a next one of the compartments 103A to 103D is opposed to the cassette inserting means 105 and the procedure described above is repeated. Thus the stimulable phosphor sheets in all the cassettes 110A to 110D are processed and returned to the respective cassettes and the cassettes 110A to 110D are received in the cassette receiving section 102. Thereafter, the door 170 is opened and all the cassettes 110A to 110D are taken out at one time.

As can be understood from the description above, in the radiation image read-out apparatus 120 of this embodiment, a plurality of cassettes of different sizes 110A to 110D are grouped by size and are stacked in the respective compartments 103A to 103D in the cassette holding section 101. Then arbitrary one of the cassettes is taken out from the cassette holding section 101 and transferred to the cassette delivery means 109, and the stimulable phosphor sheet in the cassette is taken out from the cassette and returned to the same cassette after readout and erasure, and the cassette is transferred to the cassette receiving section 102. Accordingly, different sizes of cassettes can be handled without trouble such as mounting adapters, whereby load on the operator can be reduced and read-out of radiation images and erasure of the stimulable phosphor sheets can be efficiently carried out.

Figure 4:
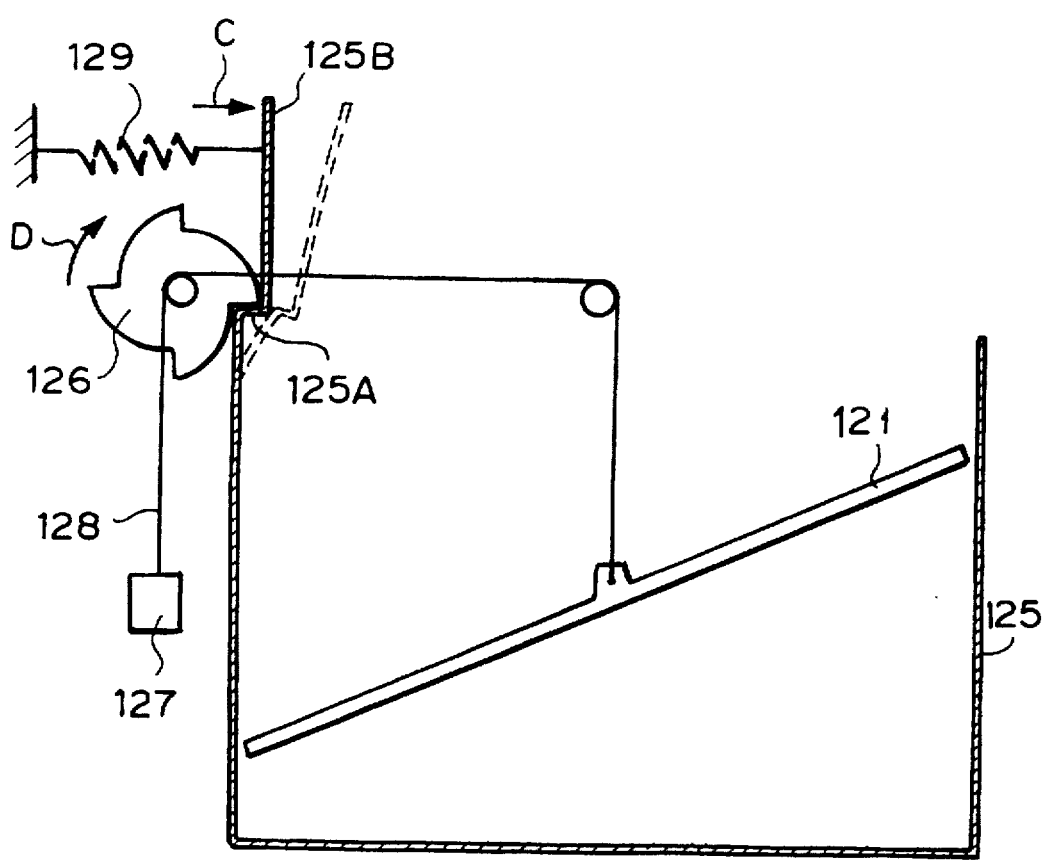
FIG. 4 is a view showing a modification of the cassette receiving section employed in the second embodiment.

Though, in the second embodiment, the support plate 121 is supported by the springs 122 and 123 and is lowered under the weight of the cassettes thereon, it is possible to move up and down the support plate 121 by a ratchet mechanism as shown in FIG. 4. That is, a shoulder 125A is formed on the cassette receiving box 125 and the portion 125B of the cassette receiving box 125 above the shoulder 125A is urged leftward by a spring 129. A ratchet wheel 126 is disposed to engage with the shoulder 125A and the support plate 121 is connected to one end of a wire 128 passed around the rotational shaft of the ratchet wheel 126 and hung by the wire 128 balanced by a counter balance 127 connected to the other end of the wire 128. Every time one cassette falls onto the support plate 121, the portion 125B is pressed in the direction of arrow C to permit the ratchet wheel 126 to rotate in the direction of arrow D, thereby lowering the support plate 121 by a predetermined amount. When the cassettes 110A to 110D are taken out from the cassette receiving box 125, the support plate 121 is moved upward to the original position under the weight of the counter balance 127.

Figure 5:
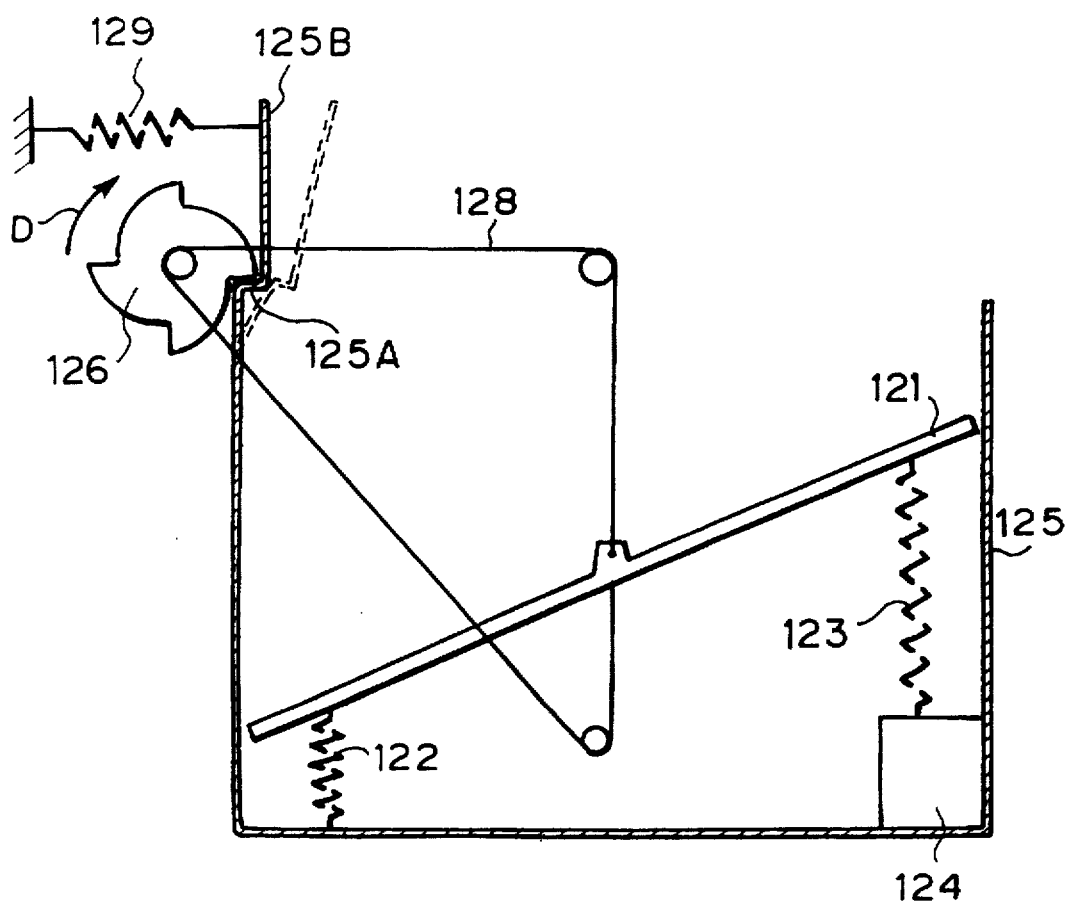
FIG. 5 is a view showing another modification of the cassette receiving section employed in the second embodiment.

A combination of a ratchet mechanism and springs may be employed as shown in FIG. 5. In this modification, the support plate 121 is connected to an endless wire 128 passed around the rotational shaft of the ratchet wheel 126 and is urged upward by a pair of springs 122 and 123, the latter being mounted on a base 124 as that shown in FIG. 2. Every time one cassette falls onto the support plate 121, the portion 125B is pressed in the direction of arrow C to permit the ratchet wheel 126 to rotate in the direction of arrow D, thereby lowering the support plate 121 by a predetermined amount. When the cassettes 110A to 110D are taken out from the cassette receiving box 125, the support plate 121 is moved upward to the original position under the force of the springs 122 and 123.

A radiation image read-out apparatus 220 in accordance with a third embodiment of the present invention will be described with reference to FIGS. 6 to 9, hereinbelow.

Figure 6:
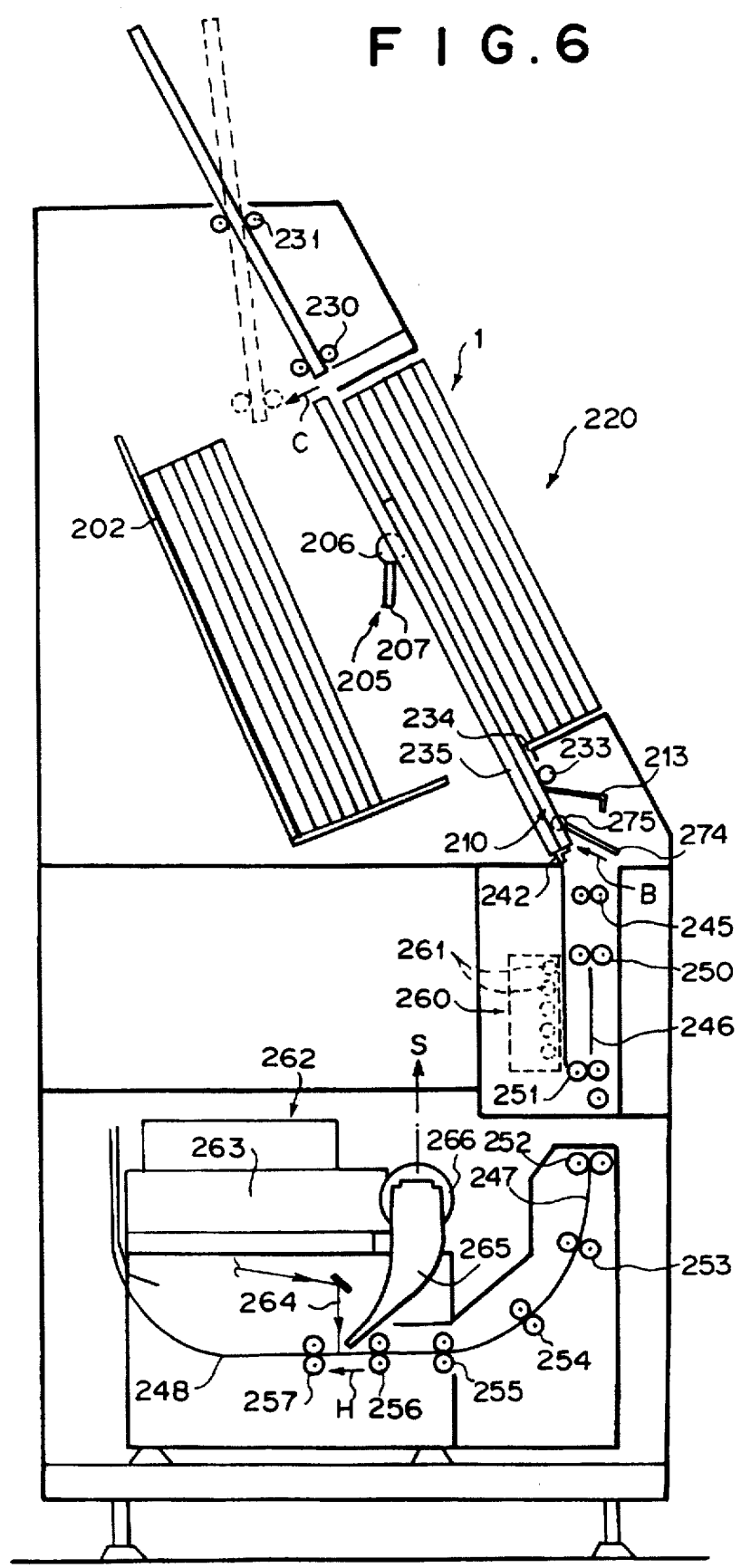
FIG. 6 is a schematic view of a radiation image read-out apparatus in accordance with a third embodiment of the present invention.

As shown in FIG. 6, a plurality of cassettes 210 respectively containing therein stimulable phosphor sheets, on which radiation images have been stored, are loaded in a stack in a cassette holding section 201 of the radiation image read-out apparatus 220. The cassette holding section 201 is inclined at a predetermined angle to the radiation image read-out apparatus 220. An inserting means 205 for inserting the lowermost cassette 210 into a cassette delivery means 209 (to be described later) comprises a roller 206 which is adapted to abut against the bottom face of the cassette 210 and is mounted for rotation on an arm 207. The roller 206 is driven by a drive means not shown and is rotated in the clockwise direction to move the lowermost cassette 210 down into the cassette delivery means 209.

The cassette 210 is inserted into the cassette delivery means 209 through an opening 234 and held by a light-shielding roller 233. The roller 233 is somewhat larger in length than the width of the cassettes 210.

Each of the cassettes 210 is moved in the following manner and the radiation image stored on the stimulable phosphor sheet in the cassette 210 is read out and the residual radiation energy remaining on the stimulable phosphor sheet after read-out is erased.

The roller 206 of the cassette inserting means 205 is rotated in the clockwise direction and the lowermost cassette 210 is fed toward the cassette holding section 109. The cassette 210 is inserted between the light-shielding roller 233 and a base plate 235 of the cassette holding section 201 through the opening 234. The cassette 210 is stopped at a predetermined position where the leading end face of the cassette 210 abuts against a stopper 242.

When an instruction to read out the radiation image from the stimulable phosphor sheet is output from a console in the radiation image read-out apparatus 220, the lid 213 of the cassette 210 is opened by a suitable means and a roller arm 274 carrying thereon a roller 275 is moved toward the cassette 210 in the direction of arrow B. The roller arm 274 is stopped when the roller 275 thereon is brought into contact with the stimulable phosphor sheet in the cassette 210.

Then the roller 275 is rotated in the counterclockwise direction by a drive means not shown to feed out the stimulable phosphor sheet downward from the cassette 210. The stimulable phosphor sheet is transferred to a read-out section 262 through an erasing section 260 by a sheet transfer system comprising guide plates 246, 247 and 248, nip rollers 245 and 250 to 257 and the like.

Though being well known as disclosed, for instance, in U.S. Pat. No. 4,258,264, the image read-out processing in the read-out section 162 will be briefly described hereinbelow. While conveying the stimulable phosphor sheet at a constant speed in the direction of arrow H for sub-scanning by nip rollers 255, 256 and 257, a stimulating laser beam 264 emitted from a main scanning optical system 263 is caused to scan the stimulable phosphor sheet in a direction substantially perpendicular to the direction of arrow H for main scanning with the output of the laser beam 264 controlled according to read-out conditions.

When the stimulable phosphor sheet is exposed to the laser beam 264, the exposed portion of the stimulable phosphor sheet emits light in an amount proportional to the amount of radiation energy stored thereon and the emitted light is guided by a light guide member 265 and photoelectrically detected by a photomultiplier 266. Thus the photomultiplier 266 outputs an image signal S representing the radiation image stored on the stimulable phosphor sheet. The image signal S is processed and used for the reproduction of the radiation image of the object as a visible image on a cathode ray tube (CRT) display device (not shown). Otherwise the processed image signal S may be sent to an image reproducing system such as a light beam scanning recording system.

After read-out of the radiation image, the nip rollers 245 and 250 to 257 are reversed to convey the stimulable phosphor sheet from the read-out section 262 to the cassette delivery means 209 via the erasing section 260. When the stimulable phosphor sheet is passed through the erasing section 260, a plurality of erasing light sources 261 are put on and the stimulable phosphor sheet is exposed to erasing light from the sources 261, whereby residual radiation energy on the stimulable phosphor sheet is released and the stimulable phosphor sheet is recovered.

Thereafter the recovered stimulable phosphor sheet is returned to the cassette 210 by the roller 275 which is now rotated in the clockwise direction. Then the roller arm 274 is retracted away from the cassette 210 to return the roller 275 to a waiting position and the lid 213 is closed by said means for opening the lid 213. When a detecting means detects that the roller 275 has been returned to the waiting position, the roller 206 of the cassette inserting means 205 is rotated in the counterclockwise direction to remove the cassette 210 from the cassette delivery means 209 and to return the cassette 210 to the cassette holding section 201.

Then the roller 206 is further rotated in the counterclockwise direction to move the returned cassette 210 above the cassette holding section 201 and to insert the cassette 210 between a pair of rollers 230 and between a pair of rollers 231 disposed above the rollers 230. The roller 206 is stopped when the lower end of the cassette 210 reaches the lower rollers 230. The lower rollers 230 are urged toward each other and are driven by a drive means (not shown). Thereafter the lower rollers 230 are moved in the direction of arrow C. Since the upper rollers 231 are fixed, the cassette 210 is swung about the upper rollers 231 as the lower rollers 230 are moved in the direction of arrow C and the lower rollers 230 are stopped at a predetermined position. Then the rollers 230 are rotated to feed the cassette 210 downward into a cassette receiving section 202 disposed behind the cassette holding section 201.

Then the procedure described above is repeated on the other cassettes in the cassette holding section 201. Thus the stimulable phosphor sheets in all the cassettes 210 are processed and returned to the respective cassettes and the cassettes 210 are received in the cassette receiving section 202. Thereafter, the door of the radiation image read-out apparatus 220 is opened and all the cassettes 210 are taken out at one time.

As can be understood from the description above, in the radiation image read-out apparatus 220 of this embodiment, a plurality of cassettes 210 are loaded at one time and are unloaded at one time after processed. Accordingly, change of cassettes may be made less frequently and the stimulable phosphor sheets can be processed continuously. Further since the cassettes are moved vertically when they are conveyed to the cassette receiving section 202, the radiation image read-out apparatus 220 can be small in size in horizontal directions and can be installed in a relatively limited space.

Further since the cassette holding section 201 and the cassette receiving section 202 are disposed above the read-out section 262 and the erasing section 260, the operator can change cassettes in a standing position, thereby facilitating change of cassettes and improving working efficiency.

Figure 7:
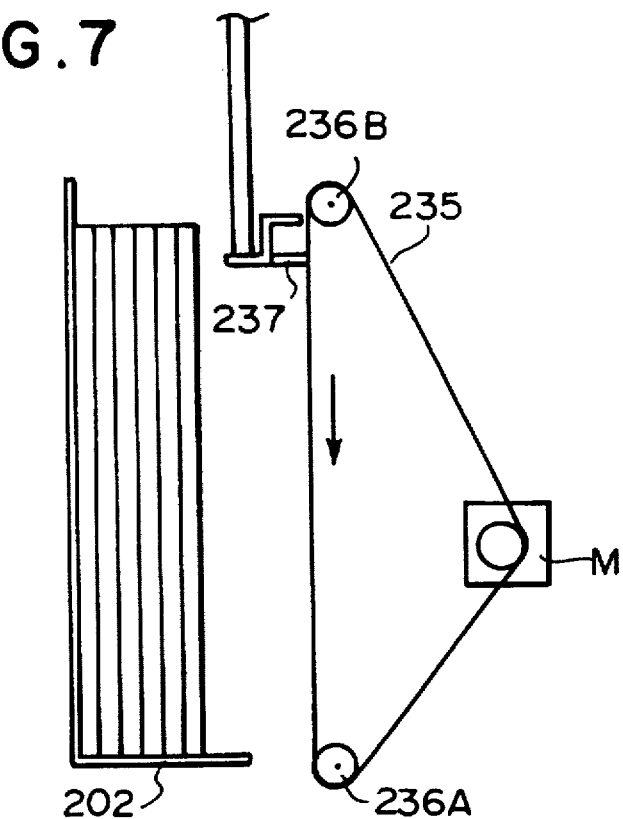
FIG. 7 is a view showing a modification of the cassette receiving section employed in the apparatus shown in FIG. 6.

In the embodiment described above, the cassette 210 is dropped in the cassette receiving section 202 under gravity after it is released from the rollers 230. However the cassette 210 may be fed to the cassette receiving section 202 in other ways. For example, as shown in FIG. 7, an endless belt 235 driven by a motor M is passed around a pair of pulleys 236A and 236B and a bracket 237 is fixed to the endless belt 235. The cassette 210 is dropped from the rollers 230 to rest on the bracket 237. Then the endless belt 235 is driven to convey the cassette 210 on the bracket 237 to the cassette receiving section 202. In this case, the cassette receiving section 202 receives the cassettes 210 in a erected position.

Figure 8:
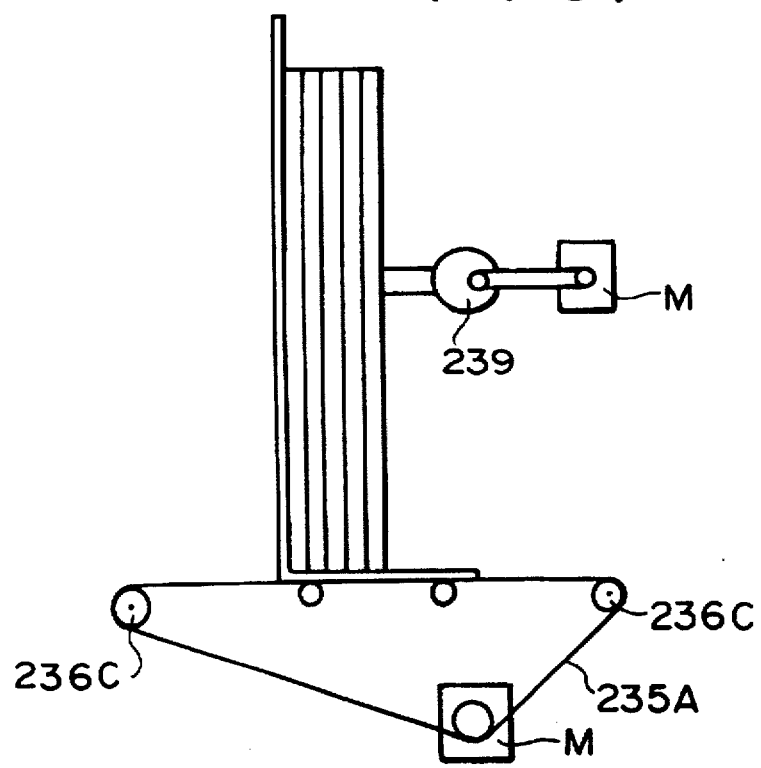
FIG. 8 is a view showing another modification of the cassette receiving section employed in the apparatus shown in FIG. 6.

Further in order to prevent the erected cassettes from falling down, a motor driven pusher cam mechanism 239 may be provided as shown in FIG. 8. In this case, for example, the cassette receiving section 202 is mounted on a motor driven endless belt 235A passed around a pair of pulleys 236C and 236D and is moved toward and away from the cam mechanism 239 to adjust the position of the rightmost cassette in the stack of the cassettes relative to the mechanism 239.

Figure 9:
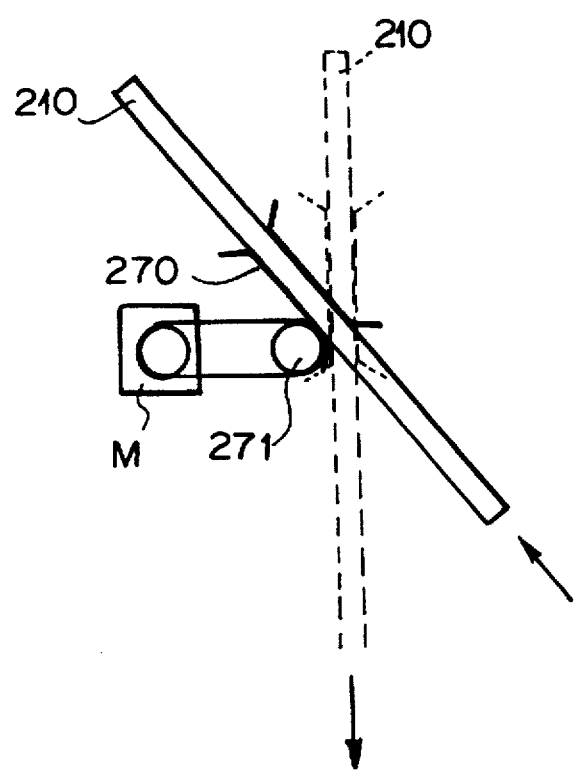
FIG. 9 is a view showing a modification of the cassette transfer means employed in the apparatus shown in FIG. 6.

Further though, in the embodiment described above, the cassette 210 moved above the cassette holding section 201 is moved toward the cassette receiving section 202 held by a pair of rollers 230, this mechanism can be modified, for instance, as shown in FIG. 9. That is, as shown in FIG. 9, the cassette 210 moved above the cassette holding section 201 is inserted into a guide member 270. The guide member 270 is supported for rotation and is connected to pulley 271 which is driven by a motor M. When the pulley 271 is rotated by the motor M, the guide member 270 is inclined to direct the cassette 210 toward the cassette receiving section 202.

What is claimed is:

1. A radiation image read-out apparatus comprising:

a radiation image read-out section which reads out a radiation image stored on a stimulable phosphor sheet, an erasing section which erases residual image information remaining on the stimulable phosphor sheet after read-out, a cassette holding section in which a plurality of cassettes each containing therein a stimulable phosphor sheet are loaded, and a sheet transfer means which takes out the stimulable phosphor sheet from an arbitrary one of the cassettes, transfers the stimulable phosphor sheet in a forward direction along a transfer path to the radiation image read-out section and the erasing section and always returns the stimulable phosphor sheet in a reverse direction along said transfer path to the same cassette from which the stimulable phosphor sheet was taken out.

2. A radiation image read-out apparatus comprising:

a radiation image read-out section which reads out a radiation image stored on a stimulable phosphor sheet, an erasing section which erases residual image information remaining on the stimulable phosphor sheet after read-out, a cassette holding section in which a plurality of cassettes each containing therein a stimulable phosphor sheet are loaded in a plurality of stacks of cassettes of different sizes, each stack formed of a group of cassettes of a size, a cassette delivery means which takes out a selected one of the cassettes from the cassette holding section and holds it, means for moving said cassette holding section to align said selected cassette with said cassette delivery means such that a cassette of any of said different sizes can be selected, a sheet transfer means which takes out the stimulable phosphor sheet from the cassette held by the cassette delivery means, transfers the stimulable phosphor sheet to the radiation image read-out section and the erasing section and returns the stimulable phosphor sheet to the cassette held by the cassette delivery means, and a cassette receiving section which receives the cassettes in sequence from the cassette delivery means after read-out and erasure and stores them in a stack.

3. A radiation image read-out apparatus comprising a radiation image read-out section which reads out a radiation image stored on a stimulable phosphor sheet, an erasing section which erases residual image information remaining on the stimulable phosphor sheet after read-out, a cassette holding section which holds a plurality of cassettes, a cassette delivery means which takes out one of the cassettes from the cassette holding section and holds it, a sheet transfer means which takes out the stimulable phosphor sheet from the cassette held by the cassette delivery means, transfers the stimulable phosphor sheet to the radiation image read-out section and the erasing section and returns the stimulable phosphor sheet to the cassette held by the cassette delivery means, a cassette receiving section which receives the cassettes in sequence after read-out and erasure, the cassette holding section and the cassette receiving section being disposed above the radiation image read-out section and the erasing section one behind the other, and a cassette transfer means which transfers the cassette, in which the stimulable phosphor sheet after read-out and erasure has been returned, above the cassette holding section and to the cassette receiving section.

* * * * *